H. C. DUNLAVY.
AIR DEFLECTOR.
APPLICATION FILED JUNE 23, 1911.

1,037,138.

Patented Aug. 27, 1912.

WITNESSES

INVENTOR
Harry C. Dunlavy
BY
ATTORNEYS

UNITED STATES PATENT OFFICE.

HARRY CRAFT DUNLAVY, OF FRESNO, CALIFORNIA.

AIR-DEFLECTOR.

1,037,138. Specification of Letters Patent. Patented Aug. 27, 1912.

Application filed June 23, 1911. Serial No. 634,843.

*To all whom it may concern:*

Be it known that I, HARRY C. DUNLAVY, a citizen of the United States, and a resident of Fresno, in the county of Fresno and State of California, have invented a new and Improved Air-Deflector, of which the following is a full, clear, and exact description.

The object of the invention is to provide a new and improved air deflector, more especially designed for use on high speed or racing automobiles and other power-driven vehicles, and arranged to counterbalance the lateral or centrifugal force which is developed on the vehicle traversing a curved course, the air deflector serving to relieve the wheels or tires of undue strain, and prevent slipping of the tires on the roadway. For the purpose mentioned, use is made of a vane mounted on a vehicle shaft journaled on the vehicle and under the control of the operator.

A practical embodiment of the invention is represented in the accompanying drawings forming a part of this specification, in which similar characters of reference indicate corresponding parts in both views.

Figure 1:
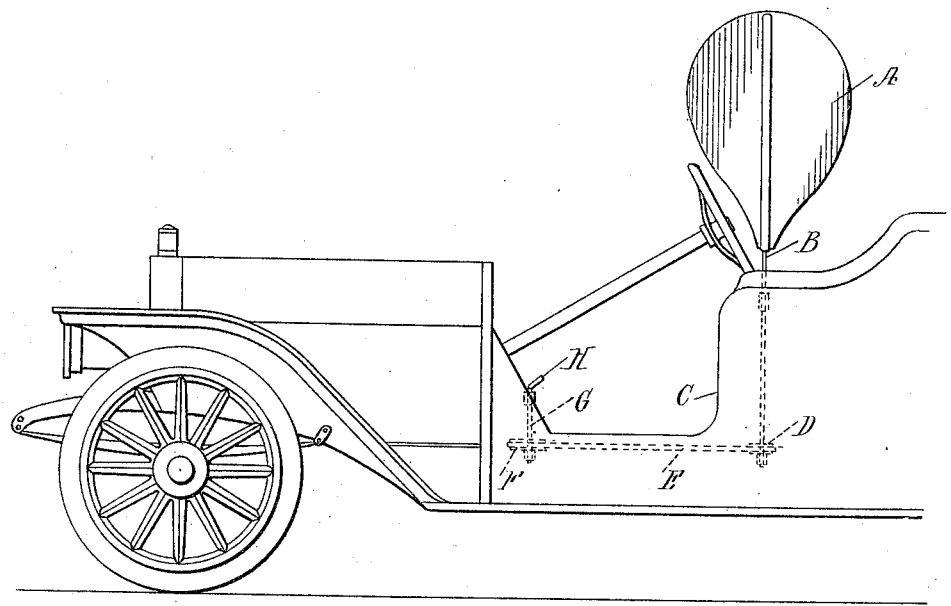
Figure 2:
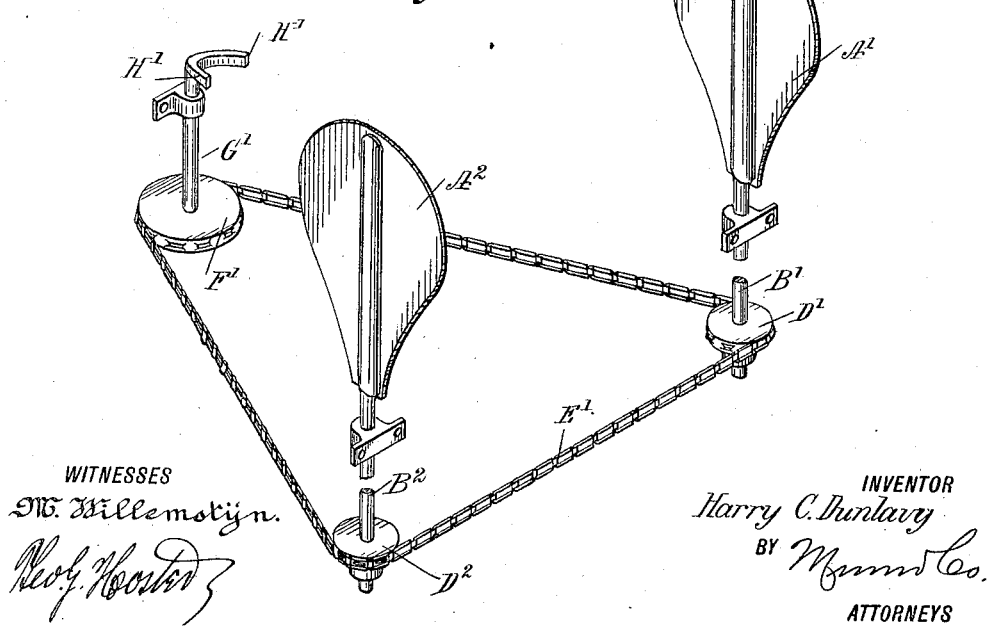

Figure 1 is a side elevation of the air deflector as applied to an automobile; and Fig. 2 is a perspective view of the air deflector provided with two vanes geared together to operate in unison.

The air deflector shown in Fig. 1 consists essentially of a vane A mounted on a vertically-disposed shaft B journaled in suitable bearings on the automobile C at any convenient point, and on the lower end of the shaft B is secured a sprocket wheel D connected by a sprocket chain E with a sprocket wheel F secured on a second vertical shaft G, likewise journaled on the automobile C, and provided at its upper end with foot levers H adapted to be engaged by the foot of the operator in charge of the automobile, to permit the operator to turn the shaft G and with it the shaft B so that the vane A is moved into a desired position. Normally the vane A extends in a vertical longitudinal plane, so as to offer the least resistance to the air on the automobile C traveling in a straight course, and when the automobile is traversing a curved course then the operator in charge of the automobile can readily turn the vane A into an angular position by operating the foot lever H correspondingly so that the vane A offers a resistance to the air to counterbalance the lateral or centrifugal force which is developed on the vehicle during the time it travels over the curved course. It is understood that the operator can turn the vane A into a more or less inclined position according to the degree of curvature in the roadway. When the automobile again reaches the straight course, the operator releases the foot levers H so that the vane A returns to its normal position to offer the least resistance to the air.

Although I have shown and described the air deflector in the form of a single vane, it is evident that two or more such vanes may be employed, for instance, as shown in Fig. 2, two vanes A' and A² are mounted on vertical shafts B', B² journaled on the automobile on opposite sides of the driver's seat, and the shafts B' and B² are provided with sprocket wheels D', D² around which passes a sprocket chain E' also passing around a sprocket wheel F' secured on a second shaft G' journaled on the automobile and provided with foot levers H'. The vanes A' and A² are spaced apart and are arranged parallel one to the other, and when the foot levers H' are actuated by the operator the said vanes turn in unison from a vertical longitudinal position into an angular position to offer more resistance to the air for the purpose previously described relative to the action of the vane A.

By the use of the air deflector, the automobile C may be provided with larger wheels thus lessening the resistance and also lessening the linear slip of the tires, as they will then have a greater length of contact upon the track.

It is understood that small wheels must be used under the present conditions for the reason that they can resist greater lateral force at their periphery than can large wheels of similar construction. It is further understood that the sprocket chain and wheel connection between the above-mentioned shafts G and B may be supplanted by any other adequate means of transmission.

Having thus described my invention, I claim as new and desire to secure by Letters Patent:

1. In combination with an automobile or similar vehicle, a vane arranged normally in a vertical longitudinal plane, a vertical shaft to the upper end of which the said vane is secured approximately at its longitudinal center, and manually-controlled mechanism connected with the said shaft to turn the latter and the vane into an angular position relative to the vertical longitudinal plane.

2. In combination with an automobile or similar vehicle, a vane arranged normally in a vertical longitudinal plane, a vertical shaft carrying at its upper end the said vane, the vane being secured to the shaft approximately at its center of length, a second vertical shaft, a foot lever on the upper end of the said second shaft for turning the latter, and a sprocket chain and wheel connection between the said shafts.

3. The combination with an automobile or like vehicle, of a vertical shaft mounted on the automobile, a pear-shaped vane secured to the upper end of the shaft approximately at the center of length with its smaller end downward, a second vertical shaft, a foot lever on the upper end of the second shaft, and gearing between the said shafts.

In testimony whereof I have signed my name to this specification in the presence of two subscribing witnesses.

HARRY CRAFT DUNLAVY.

Witnesses:
 E. S. MARTIN, Sr.,
 B. C. STAMPS.

---

Copies of this patent may be obtained for five cents each, by addressing the "Commissioner of Patents, Washington, D. C."